US010069839B2

(12) United States Patent
Madakasira et al.

(10) Patent No.: US 10,069,839 B2
(45) Date of Patent: Sep. 4, 2018

(54) DETERMINE APPROXIMATE CURRENT TIME ON A CLIENT USING SECURE PROTOCOL METADATA

(71) Applicant: Microsoft Technology Licensing, LLC, Redmond, WA (US)

(72) Inventors: Sarath Madakasira, Bothell, WA (US); Philip Joseph Hallin, Townsend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 15/041,657

(22) Filed: Feb. 11, 2016

(65) Prior Publication Data
US 2017/0237737 A1 Aug. 17, 2017

(51) Int. Cl.
*H04L 29/06* (2006.01)
(52) U.S. Cl.
CPC ........ *H04L 63/105* (2013.01); *H04L 63/0823* (2013.01); *H04L 2463/121* (2013.01)
(58) Field of Classification Search
CPC ............... H04L 63/105; H04L 63/0823; H04L 2463/121
See application file for complete search history.

(56) References Cited

U.S. PATENT DOCUMENTS

| 5,533,021 A | 7/1996 | Branstad et al. |
| 5,790,805 A | 8/1998 | Bantum |
| 5,942,877 A * | 8/1999 | Nishimura ............... G06F 1/14 320/112 |
| 6,094,485 A | 7/2000 | Weinstein et al. |
| 6,094,672 A | 7/2000 | Willie et al. |

(Continued)

FOREIGN PATENT DOCUMENTS

| CN | 1933414 A | 3/2007 |
| WO | 2013078957 A1 | 6/2013 |

OTHER PUBLICATIONS

Ting et al., "A Digital Standard Time Dissemination Architecture for Trustworthy Time Stamping", Jul. 2011, IEEE Transactions on Instrumentation and Measurement, vol. 60, No. 7, pp. 2584-2589 (Year: 2011).*

(Continued)

*Primary Examiner* — Kenneth W Chang
(74) *Attorney, Agent, or Firm* — Workman Nydegger (57) ABSTRACT

Establishing secure connections from a computing device to secure servers when the computing device starts with an incorrect system clock time that would ordinarily prohibit connection to the secure servers. A method includes attempting to access a plurality of secure servers. The method further includes, from each of the servers in the plurality of secure servers, receiving one or more certificates from the secure servers and metadata which includes a specification of time. The method further includes preventing secure applications from sending sensitive data to the plurality of secure servers until a system time has been approximated. The method further includes, from the secure specifications of time, approximating a current system time. The method further includes accessing another secure server using the approximated current system time and using the approximated current system time to validate a certificate from the other server.

20 Claims, 4 Drawing Sheets

(56) References Cited

U.S. PATENT DOCUMENTS

| | | | |
|---|---|---|---|
| 7,072,432 B2 | 7/2006 | Belcea | |
| 7,969,891 B2 | 6/2011 | Krober et al. | |
| 2002/0002543 A1* | 1/2002 | Spooren | G06F 21/10 705/57 |
| 2002/0056042 A1* | 5/2002 | van der Kaay | G06F 21/725 713/178 |
| 2002/0062443 A1* | 5/2002 | Lim | H04L 9/3268 713/178 |
| 2005/0138383 A1* | 6/2005 | Vainstein | G06F 21/645 713/178 |
| 2007/0033649 A1* | 2/2007 | Henriksen | G06F 21/34 726/20 |
| 2007/0239606 A1* | 10/2007 | Eisen | G06Q 20/3674 705/51 |
| 2008/0005034 A1* | 1/2008 | Kravitz | G06F 21/10 705/59 |
| 2009/0144399 A1* | 6/2009 | Schneider | H04L 12/6418 709/220 |
| 2012/0124673 A1* | 5/2012 | Zhang | H04L 63/0823 726/27 |
| 2014/0095887 A1 | 4/2014 | Nayshtut et al. | |
| 2014/0157301 A1 | 6/2014 | Saremi | |
| 2015/0334109 A1* | 11/2015 | Kasai | H04L 29/06 358/1.14 |

OTHER PUBLICATIONS

"The Chromium Projects—Sane time", Published on: Nov. 1, 2012 Available at: https://www.chromium.org/developers/design-documents/sane-time.

Elson, et al., "Fine-Grained Network Time Synchronization using Reference Broadcasts", In Proceedings of the 5th symposium on Operating systems design and implementation, vol. 36, Issue SI, Dec. 31, 2002, pp. 1-14.

Mills, David L., "Internet Time Synchronization: The Network Time Protocol", In Proceedings of IEEE Transactions on Communications, vol. 39, No. 10, Oct. 1991, pp. 1482-1493.

Elson, et al., "Wireless Sensor Networks: A New Regime for Time Synchronization", In Proceedings of the First Workshop on Hot Topics in Networks, Oct. 28, 2002, 6 pages.

* cited by examiner

DETERMINE APPROXIMATE CURRENT TIME ON A CLIENT USING SECURE PROTOCOL METADATA

BACKGROUND

Background and Relevant Art

Computers and computing systems have affected nearly every aspect of modern living. Computers are generally involved in work, recreation, healthcare, transportation, entertainment, household management, etc.

In computing systems, a system clock can be an important tool. Often the system clock is set to the actual time. This actual time can be used in various security protocols. For example, secure network protocols require a client computer system's time to be close to the actual current time within a margin of error to function. The margin of error can be large or small. If a client computer system's time is not within this margin of error, this presents a circular dependency between client computer system time and the client computer system's ability to communicate securely over the network. For example, a client computer system might not even be able to access time servers to obtain the correct time, because they would need to already have a current time that is smaller than the allowed error.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for establishing secure connections from a computing device to secure servers when the computing device starts with an incorrect system clock time that would ordinarily prohibit connection to the secure servers. The method includes attempting to access a plurality of secure servers. The method further includes, from each of the servers in the plurality of secure servers, receiving one or more certificates from the secure servers and metadata which includes a specification of time. The method further includes preventing secure applications from sending sensitive data to the plurality of secure servers until a system time has been approximated. The method further includes, from the secure specifications of time, approximating a current system time. The method further includes accessing another secure server using the approximated current system time and using the approximated current system time to validate a certificate from the other server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments described herein can allow client computer systems with incorrect time, indeed even grossly incorrect time, to attempt to access a plurality of secure servers. The secure servers would provide certificates along with a secure specification of time. Because the client computer systems do not have a time sufficiently close to the correct time, the client computer systems would not be able to establish secure connections with the secure servers, and would therefore not transmit secure data to the secure servers. However, the client computer systems could collect the secure specification of time from a plurality of servers. These secure specifications of time could then be used to approximate an actual time. This approximation of actual time could then be used to attempt to connect to another secure server (either one of the secure servers for which attempts were previously made, or to a different secure server). So long as the approximation of actual time is within an allowed margin of error, the client computer system could establish a secure connection to the secure server. At this point, the client computer system could use the approximation of actual time to connect to a time server and obtain the actual time.

This could be used to create a more efficient client computer system. For example, in some embodiments, such a client computer system would be more power efficient than previous systems as such a system would eliminate futile repeated connection attempts to secure servers. Often when a computer system fails to establish a connection the system will periodically repeat such attempts. Some embodiments herein can eliminate or at least reduce the number of attempts by allowing the client computer systems to actually make secure connections, thus obviating the need for periodic retries. This results in a power savings for such systems over other systems as computing operations, and hence power consumption, can be reduced.

Alternatively or additionally, this could be used in reduced component systems. For example, typically a system will need some sort of stored power to maintain time data when the system is disconnected from a more permanent source of power. For example, a system might require that a backup battery be implemented to maintain time data in the system when the system is unplugged from a more permanent power source. In some systems, a backup battery is included on a motherboard to supply a sufficient amount of power to maintain time data. Indeed, some laptop systems have both a battery used for main power and a backup battery used for maintaining time data. While the main power battery could be used for maintaining time data, a full depletion of the main battery, which is indeed a common occurrence, would result in the loss of time data absent the backup battery. However there is a move to minimize systems. Such a backup battery could be the size and weight of a processing chip. Thus, if the battery could be eliminated, additional hardware could be added without increasing system weight to create a more powerful system with the same weight. Alternatively, system weight and form factor could be reduced without sacrificing computing power. Further, many systems are so tightly integrated that it is virtually impossible to implement a backup battery in a configuration allowing for users to access such a backup battery when the backup battery needed to be replaced. Thus, more efficient and improved systems can be implemented by eliminating the backup battery from the system. Embodiments described herein can obviate the need to maintain time data by being able to approximate the time data to bootstrap the system's ability to make secure connections.

Further, some systems implementing the functionality illustrated herein could implement a more efficient user interface. For example, systems not having the functionality illustrated herein might need to have a more complex user interface to facilitate the ability to identify that the time is incorrect, to prompt users that the time is incorrect, and receive user input correcting the actual time. Some embodiments herein can make the user interface more efficient for the user by reducing the amount of interaction that a user would need to have with the user interface to allow the system to have the correct actual time. This would make a user interface simpler and allow a user to more efficiently interact with such an interface.

Figure 1:
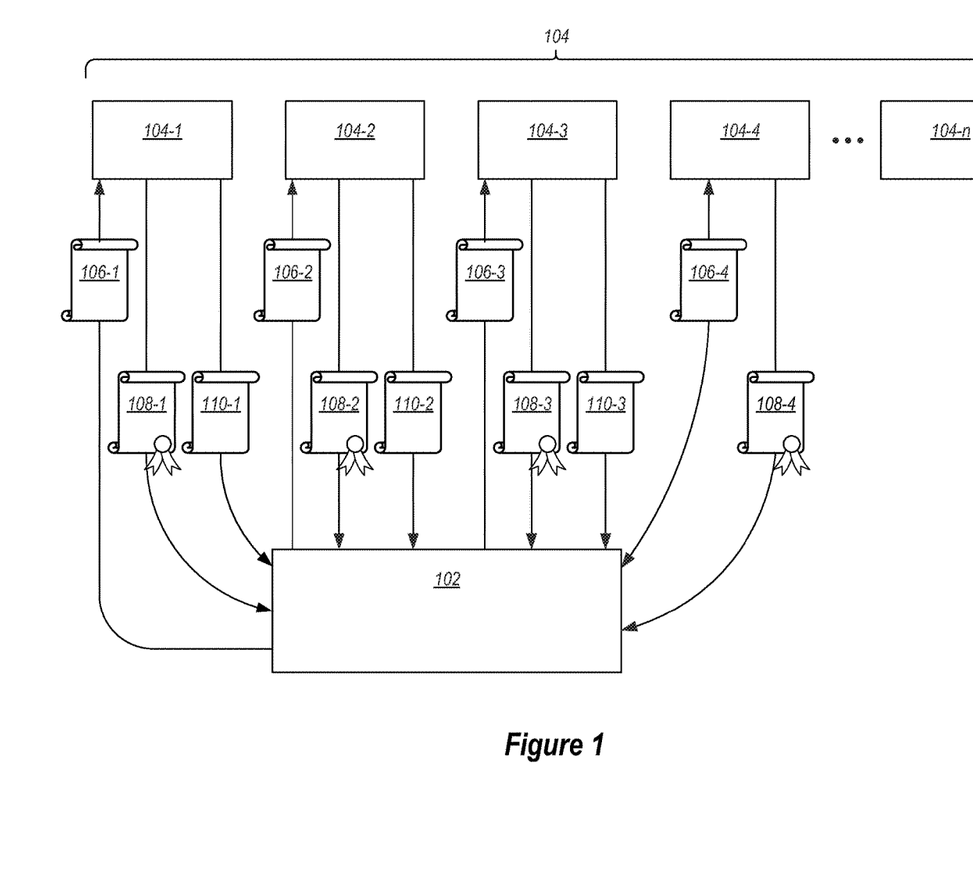
FIG. 1 illustrates a client computer system attempting to connect securely to secure server systems.

Referring now to FIG. 1, an example is illustrated. FIG. 1 illustrates a client computer system 102. The client computer system 102 may be such that it does not have stored the correct actual time, and in fact has a grossly incorrect system time. This would prevent the client computer system 102 from establishing secure connections with the secure server systems, such as secure servers systems 104 (illustrated individually as server systems 104-1 through 104-n).

However, the client computer system 102 could access a plurality of the secure systems 104 to obtain time information, as part of an attempt to establish a secure connection, and use the time information to create an approximate current time. For example, FIG. 1 illustrates the client computer system 102 sending a request 106-1 to the secure server system 104-1. In response, the secure server system 104-1 returns a certificate 108-1 and a specification of time 110-1. The specification of time 110-1, in some embodiments, may be a secure specification of time. That is, the specification of time 110-1 may be signed by a trusted signatory vouching for its validity.

The certificate 108-1 has some validity window. The time at the client computer system 102 must be within the validity window for a secure connection to be created. Because the client computer system 102 does not have a system time that is close enough to the actual time, the client computer system 102 will not be able to establish a secure connection with the secure server system 104-1. However, the client computer system 102 can store the specification of time 110-1, which can be used, as will be illustrated below, to approximate an actual time.

FIG. 1 illustrates that attempts are made by the client computer system 102 to access secure systems 104-2 and 104-3 in a fashion similar to that shown above for secure server system 104-1. As with system 104-1, the client computer system 102 is not able to establish a secure connection, but does collect certificates 108-2 and 108-3 and specifications of time 110-2 and 110-3.

The client computer system 102 can use the specifications of time 110-1, 110-2, and 110-3 to create an approximate current time at the client computer system 102. The client computer system 102 can then attempt to establish a secure connection with the secure server system 104-4. Note that this is merely one example, and the client computer system 102 could attempt to establish a connection with secure systems that it had previously attempted to establish secure connections to, such as secure systems 104-1, 104-2 or 104-3. The client computer system 102 sends a request 106-4 to the secure server system 104-4. In response, the secure system 106-4 returns a certificate 108-4. Because the approximate current time at the client computer system 102 is sufficiently close to the actual time, the client computer system is able to establish a secure connection to the secure system 106-4. In some embodiments, the secure system 106-4 may be a time server, such that the client computer system 102 could then resolve its time to the actual time.

Additional details are now illustrated.

Figure 2:
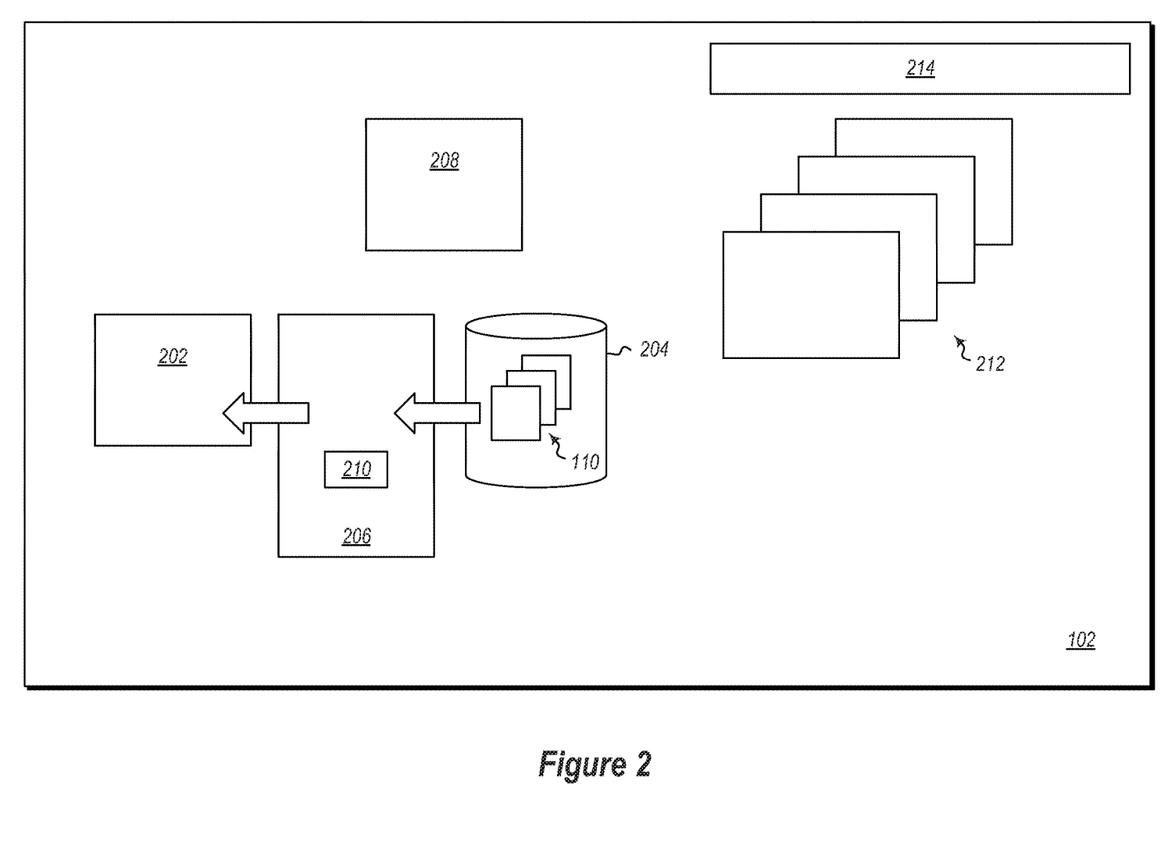
FIG. 2 illustrates details of the client computer system.

Referring now to FIG. 2, details of the client computer system 102 are illustrated. The client computer system 102 includes a system clock 202. The system clock 202 may be set to a time that is not the current actual time, and in fact may be drastically different than the current actual time, such as some time closer to a default time or random time than the actual time, some time purposely set to cause the client computer system 102 to accept expired certificates, some time outside of an allowable time for establishing secure connections with secure server systems 104, etc.

As noted above, some embodiments use time specification metadata, such as specifications of time 110 stored in storage 204 from secure protocols, such as the SSL handshake to determine the approximate current time. In particular, a time handler 206 may obtain samples (see act 302 in FIG. 3) by accessing the specifications of time 110 stored in the storage 204 to compute an estimated time, and use this time to change the system clock 202 to the estimated time. Note that the examples herein refer to the SSL protocol, but it should be appreciated that embodiments could be implemented with other secure protocols (or in some cases, even insecure protocols) as well. In cases where the client computer system clock 202 is incorrect, SSL connections are attempted with a plurality of secure servers (e.g., one or more of secure servers 104) and the time specification metadata is gathered in those attempts to allow the time handler 206 to produce a reliable approximate current time value, which can be used by the time handler 206 to correct the client computer system's system time at the system clock 202. This breaks the cyclical dependency between client computer system time and SSL protocol.

Embodiments can be implemented to not require the client computer system 202 to connect to specific server or servers and can work using time specification metadata from any secure SSL connection attempt and have the ability to exclude invalid or erroneous data. This overcomes the constraint to maintain specific servers and to ensure connectivity to these servers.

As illustrated herein an approximate current time can be generated at the time handler 206. An error range for the approximate current time can also be generated at the time handler 206 to account for any uncertainty/inaccuracy of the approximate current time value. Some embodiment may generate a quality factor at the time handler for the approximate current time. For example, the quality factor may be a confidence score or rank against other times for the approximate current time. Embodiments can implement time-validation checks at a connection validator 208 on new secure connections after a reliable approximate current time value determined.

Embodiments may use such functionality to correct the gross errors in a client computer system clock using the reliable approximate current time value to enable all users of system time to benefit from the approximate current time determination. Alternatively or additionally, embodiments may enable a client computer system to monitor its own time using the approximate current time to protect against the time being set to a grossly incorrect value. For example, nefarious actors may wish to change a client computer system's clock to create security holes. Embodiments can monitor and correct for such occurrences using principles described herein.

In some embodiments, the approximate current time is defined as the tuple {Score, MinSecureTime, MaxSecureTime, ApproximateSecureTime}. As discussed above, some embodiments, use time specification metadata (i.e., specifications of time) from attempts to establish a secure connection to approximate current time. One such protocol is the SSL protocol. The SSL protocol connection establishment handshake can include the following two different categories of time specification metadata: Server Unix Time and OCSP (Online Certificate Status Protocol) validity period.

Each set of time specification metadata presents its own unique challenges that are overcome to compute the approximate current time using them. The two computed time values have different properties and can be combined to get the most secure and accurate time possible.

Figure 3:
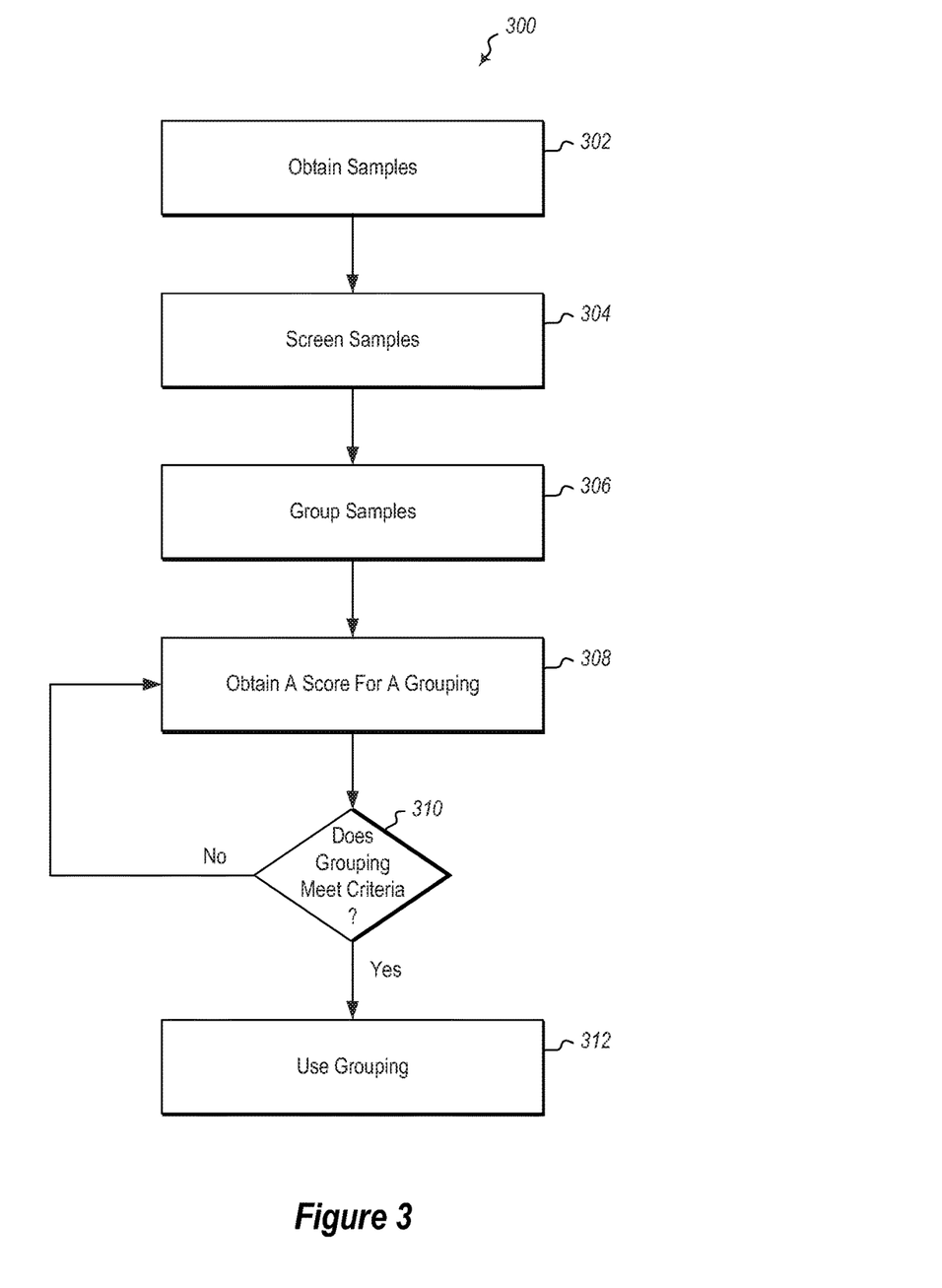
FIG. 3 illustrates a process for obtaining a grouping of specifications of times from one or more secure servers.

The time handler 206 can compute approximate current time by using ServerUnixTime samples. A "sample" refers to each separate piece of time specification metadata obtained from an attempt to establish a secure connection with a unique server. As illustrated in FIG. 3 at 302, the time handler 206 obtains samples. ServerUnixTime is an informational field in the SSL handshake. As a result, the data returned may contain actual time data or it could be a random value. If it contains time data from the SSL server, there are no guarantees on the accuracy of the time. This presents two problems that can be solved:

The first problem is accounting for inaccuracy in the ServerUnixTime value sent by an SSL server. In some embodiments, this is solved by assuming that the time value from the server is accurate only to a large time interval (e.g., +60 minutes). The approximate current time computed can reflect this accuracy as well. Thus, embodiments can ignore server high-accuracy requirements and accuracy issues due to network delays etc.

The second problem is determining time using ServerUnixTime values from various SSL handshakes. Some embodiments use multiple samples from different servers to determine the approximate current time. These samples fall into one of the two categories: (1) random time values (e.g., a typical random number used in SSL communications) or (2) actual time values (with low assumed accuracy).

As illustrated at 304 in FIG. 3, ServerUnixTime samples are first screened by the time handler 206 to make sure they fall within the certificate chain validity period for that particular SSL server. The time handler 206 eliminates from consideration the ones that do not fall within the certificate chain validity period for that particular SSL server. This step eliminates a very large percentage of random ServerUnixTime samples.

As illustrated at 306 in FIG. 3, the time handler 206 can group samples together. "Grouping" involves associating two or more samples or values that are within a predetermined range of each other. A grouping is identified by searching through the values to look for those that fall within a predetermined range.

If the ServerUnixTime with actual value from a server is accurate to at most a predetermined period (e.g., ±60 minutes), then similar samples from other servers obtained around the same time would fall into a window of approximately the same size (±60 minutes) and form a grouping. Stated differently, if embodiments identify a grouping of samples within an error window, it indicates the actual time with the error window as a margin. Note that given that time increases monotonically, the groupings are typically identified from the newest to the oldest sample order.

As sample values may be collected over a period of time and not at the same time, an alternative mechanism to identify grouping of samples includes using an "offset" between each sample and the local computer clock on the client computer system when the sample was received, instead of the sample values themselves. These offsets are also accurate to the same extent as the ServerUnixTime offsets (e.g., ±60 minutes) and would form groupings if the samples represented actual time from the SSL servers. Some embodiments handle a special case where the client computer system's system time is modified to a large extent (e.g., >60 minutes). To handle that scenario, groupings are identified by starting at the newest sample and moving to the oldest sample, which accounts for most recent changes to the client computer system's system time.

For the newest grouping identified, the time handler 206 obtains a score for each of the samples and obtains the total score of the grouping, as illustrated at 308 in FIG. 3. If a score exceeds a predetermined "reliable grouping" value (see 310 in FIG. 3), embodiments choose this grouping for further computation (see 312 in FIG. 3). Otherwise scoring is repeated for a different grouping as illustrated at 308, and a determination is made as illustrated at 310. This is repeated until a grouping meeting the criteria is found or until no grouping meeting the criteria is found.

If no grouping meeting the criteria is found, embodiments may choose the newest grouping, but where the grouping has a confidence score of 0, as the potential grouping and may retry the algorithm with new samples obtained from additional attempts to securely connect to secure servers.

Figure 4:
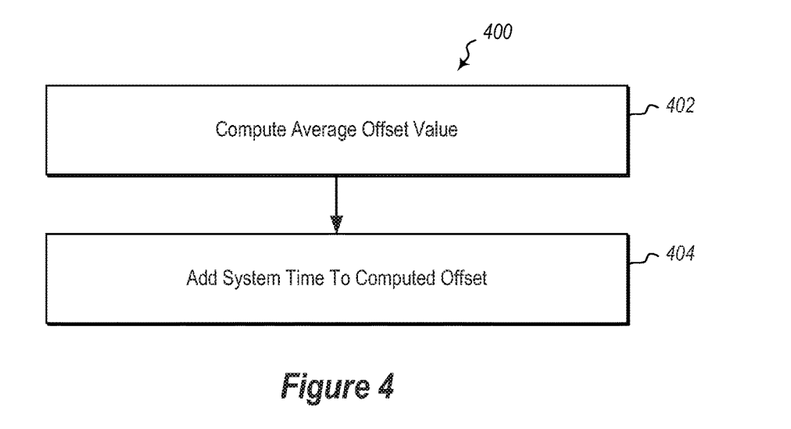
FIG. 4 illustrates a process for computing approximate current time.

The following now illustrates details of computing an approximate current time using a chosen grouping of samples. FIG. 2 illustrates that the time handler includes a time computation engine 210. The time computation engine can perform the computation using "offset" values. As illustrated in FIG. 4 at 402, in the chosen grouping, the time computation engine 210 computes the average offset value. This gives the average difference between the client computer system's system clock from the chosen group of ServerUnixTime samples. This can be a positive or negative value, with the same accuracy assumed for the ServerUnix-Time values above (e.g., ±60 minutes). An alternative variation of this computation can use weighted averages based on the age of the sample or the server it comes from.

As illustrated at 406, the approximate current time value is computed by the time computation engine by adding the client computer system's current local time to the computed offset. This value has the same accuracy as the average offset (e.g., ±60 minutes).

Embodiments can compute the approximate current time by using sample time values. An alternate mechanism to compute approximate current time from a grouping is for the time computation engine 210 to generate a simple average of the time values in a grouping. This value comes with an inaccuracy, which is the larger of ±60 minutes (in the illustrated example) and the smallest and the largest time values in the grouping. Adding/subtracting inaccuracy values to the computed value gives lower and upper limits of the time range. the output of either of the above computation produces three values: (1) approximate current time; (2) approximate current time Low=approximate current time−accuracy bound (e.g., 60 minutes); and (3) approximate current time High=approximate current time+accuracy bound (e.g., 60 minutes)

The output of this algorithm is the tuple: {Approximate current time, approximate current time Low, approximate current time High, grouping Score}.

In some embodiments the time computation engine 210 can compute approximate current time using the stapled OCSP validity period. OCSP stapling is an optional extension to the SSL protocol handshake wherein the OCSP validity packet is stapled to the server SSL certificate chain. This packet has signed information about the validity of the SSL certificate chain including a validity period of only up to several days. The validity period varies from one SSL server to another based on its configuration and is almost random. The client computer system is expected to consider the SSL certificate chain valid only if the client computer system's current time is within the validity period of that packet. Embodiments can use the validity metadata to compute approximate current time.

By definition, OCSP data is very secure and reliable. However, some embodiments do not implicitly trust individual samples as that would be akin to trusting a single server. These embodiments use a grouping of samples instead.

The individual OCSP validity period is also very large and gives an accuracy of several days. By using grouping, embodiments can improve this accuracy. Each sample corresponds to a single OCSP validity period which is represented as the tuple {start time, end time}.

Samples are first screened to make sure they fall within the certificate chain validity period for that particular SSL server. This eliminates data from misconfigured servers. A "grouping" in this context is defined as a set of samples whose validity periods overlap.

Embodiments find a grouping of samples, starting with the sample with newest validity start time. Embodiments then compute the score of the grouping and determine if this grouping is reliable or not. If it is not reliable, embodiments move to the sample with next newest validity start time and so on till a valid grouping is found or all samples in the predetermined time window are exhausted.

If no grouping is found meeting the above criteria, the algorithm considers the validity period with the latest start time/end time as the result, with a confidence score of zero.

To prevent expired OCSP packets from interfering with the process, packets received older than the predetermined window of time (e.g., in the last 120 minutes) are discarded.

The following illustrates how the time computation engine 210 determines an approximate current time range. Various different alternative processes may be used as illustrated below.

Some embodiments may use an overlap method to determine an approximate current time range. This method to compute approximate current time is based on the fact that valid OCSP packets are used after the validity period start time and not after the validity period ends. Given this and the high-confidence chosen grouping of packets, the actual time will be between the latest start time and the earliest end time in that grouping. Hence the start time for the approximate current time range is the highest start time in the grouping and the end time in an approximate current time range is the smallest end time.

Alternatively or additionally, some embodiments may use a simple averaging method to determine an approximate current time range. For this method, embodiments compute the approximate current time range from the sample periods using the simple average of the start times of the packets in the grouping as the start value of the approximate current time range and the simple average of the end times of the packets as the end value of the approximate current time range.

To allow for inaccuracies in the SSL server system time which leak into when the server starts/ends using specific OCSP packet, a predetermined margin of error (e.g., ±60 minutes) is subtracted from the secure start time and added to the secure end time.

The following now illustrates details with respect to determining the approximate current time value. Once embodiments determine an approximate current time range, embodiments can compute an approximate current time value based on the range. The accuracy of the approximate current time value is the size of the range itself. One method to compute the approximate current time value is to take a simple average of the start and end values of the approximate current time range. Another method to compute the approximate current time value is based on the common understanding that SSL servers renew their OCSP packets before they expire. This implies that the current time is likely to be in the first half of a range rather than the second half and the approximate current time can be computed as the weighted average of the start and end time values, with more weight assigned to the start time value.

The output of an approximate current time computation method is the tuple: {Approximate current time, approximate current time Low, approximate current time High, grouping Score}.

The following now illustrates a scoring mechanism for a grouping of samples. The scoring mechanism assigns a numerical score to the computed approximate current time. It can be used to determine whether or not it is reliably secure. A grouping with only samples from a single SSL server are unreliable due to the nature of the time specification metadata or potential misconfiguration/maliciousness of the server. Such standalone samples are, in this particular example, always assigned a score of zero. A grouping comprising samples from different servers is given non-zero score to indicate the extent and reliability of that grouping as defined by the client computer system computer. The scoring mechanism also defines a function IsSecureTimeReliable (score) that returns a Boolean value indicating whether or not the score was reliable.

Some embodiments may implement simple scoring. For example, each sample in a grouping is assigned a score of 1. A score of 3 (indicating at least three samples from different servers) or more is considered to be reliable.

Some embodiments may implement scoring with bias for known SSL Servers and OCSP validity. In this example, embodiments implement a scoring system where the client computer system computer has some "known SSL servers" that it wants to give preference to, as well as a preference to OCSP samples. For example, one embodiment assigns a score of 2 for each sample in the grouping; assign a bonus score of 1 to sample from a "known SSL server"; and assigns a bonus score of 1 to the score if this is an OCSP sample grouping. In this example, a score of 6 or more is considered reliable, which can be from three (3) ServerUnixTime samples or two (2) OCSP validity samples or ServerUnixTime from two (2) known SSL servers.

Embodiments may implement a process for combining approximate current time data from ServerUnixTime and OCSP validity algorithms. This process includes a method to combine the approximate current time data computed using ServerUnixTime and OCSP validity and generate an approximate current time value with the best features of the two data sources—namely reliability and the better accuracy. An example algorithm is illustrated below:

```
SecureTime(ServerUnixTime) = st1 = { Score1, MinSecureTime1,
MaxSecureTime1, ApproximateSecureTime1}
SecureTime(OCSP validity) = st2 = { Score2, MinSectureTime2,
MaxSecureTime2, ApproximateSecureTime2}
SecureTime
CombinedSecureTime(st1, st2)
{
If (IsSecureTimeReliable(st1.Score))
{
    If(IsSecureTimeReliable(st2.Score))
    {
        If (st2.MinSecureTime <= st1.MinSecureTime &&
        st2.MaxSecureTime >= st1.MaxSecureTime)
        {
            // accurate and most reliable
            Return st1;
        }
        Else
        {
            // Highly improbable
            // Return the more reliable time
            Return st2;
        }
    }
    Else
    {
        // accurate and identified as reliable
        Return st1;
    }
}
Else
{
    If(IsSecureTimeReliable(st2.Score))
    {
        If (st2.MinSecureTime <= st1.MinSecureTime &&
        st2.MaxSecureTime >= st1.MaxSecureTime)
        {
            // Augment the OCSP data using the ServerUnixTime
            data based on this validation
            St2.ApproximateSecureTime =
            st1. ApproximateSecureTime;
            // still accurate and reliable
            Return st2;
        }
        Else
        {
            // reliable OCSP data is the only data that is available
            Return st2;
```
```
        }
    }
    Else
    {
        // not reliable, but this is the data that is currently available
        Return st1;
    }
}
}
```

The approximate current time returned by the above combining algorithm is the most accurate and most reliable time based on the input provided.

This data can be used by SSL protocol processing in place of the client computer system time for validation and other purposes. It can also be used to set the client computer system time to specific values.

The following illustrates a modified SSL connection establishment to enable bootstrapping approximate current time computations. SSL connection establishment on the client computer system performs a series of checks including checks on the certificates and OCSP stapled validity period using the client computer system computer's system time. The sequence of checks is modified as described below to enable providing valid data into approximate current time algorithm to bootstrap time computations.

Client SSL connection establishment presents the time specification metadata from valid, successful SSL connections as input samples to the approximate current time algorithms.

In case the client computer system determines that the SSL connection cannot be established due to an inconsistency between the client computer system's local system time and the server metadata (e.g., server certificate chain validity or OCSP packet validity) and no reliable approximate current time is available, the client computer system determines that the SSL connection cannot be established due to an inconsistency between the client computer system's local system time and the server metadata (e.g., server certificate chain validity or OCSP packet validity), the client computer system uses the computed approximate current time, only if it is deemed to be reliable for time related validation of SSL connection establishment. (In the example described above, a score of 6 or larger is deemed reliable). In particular, the client presents the time specification metadata from the SSL connection in this case as input samples to the approximate system time mechanisms, such as the time handler 206. This helps break the cyclic dependency between the secure protocols and the client system time. In case the client computer system determines that the SSL connection cannot be established due to an inconsistency between the client computer system's local system time and the server metadata (e.g., server certificate chain validity or OCSP packet validity), it uses the approximate current time. The client presents the time specification metadata from the SSL connection in this case as input samples to the approximate system time mechanisms (e.g., the time handler 206).

The client computer system maintains its system time using the approximate current time computed from SSL time specification metadata. A client computer system computer can correct its local system time reliably and securely using the functionality described above. The approximate current time value computed using the above algorithms helps meet this goal.

Further, in some embodiments, the client computer system computer can periodically check its system clock against the computed reliable approximate current time value and adjust its system clock if it is outside the approximate current time range by more than a certain threshold (either predefined or configured). This helps the applications on client computer system computer benefit from having a system time that is maintained close to the actual time.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
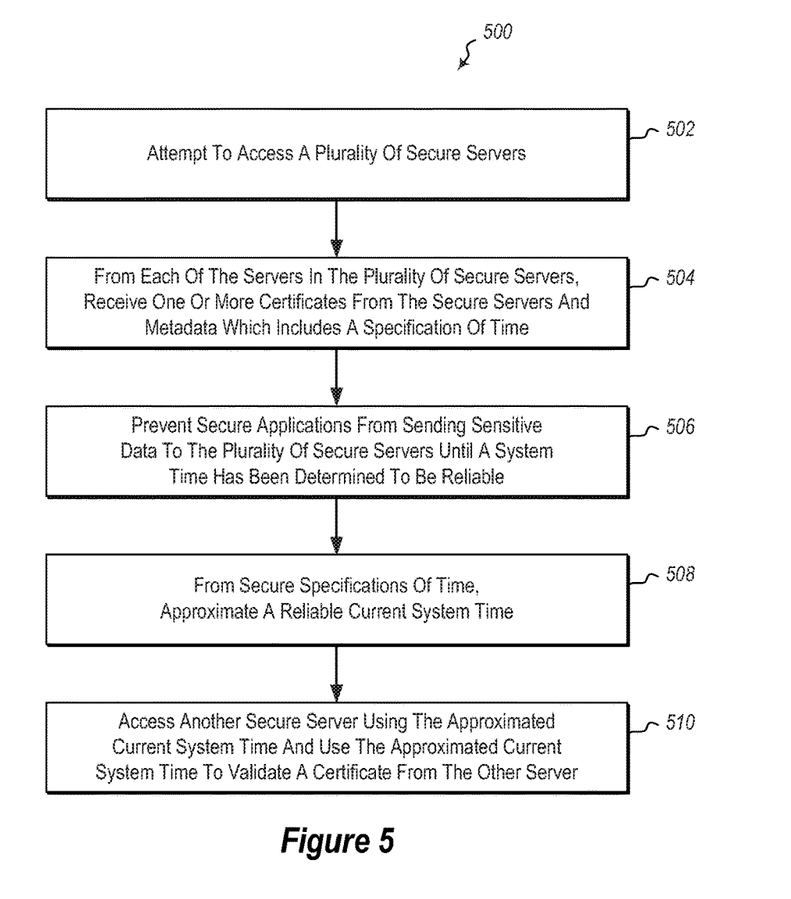
FIG. 5 illustrates a method of establishing secure connections from a computing device to secure servers.

Referring now to FIG. 5, a method 500 is illustrated. The method 500 may be practiced in a computing environment, and includes acts for establishing secure connections from a computing device to secure servers when the computing device starts with an incorrect system clock time that would ordinarily prohibit connection to the secure servers. Such an incorrect time may result from, for example, a battery used to power the system clock running down resulting in a resetting of the system clock to a default value or random value, a malicious reset of the system clock, etc.

The method 500 includes attempting to access a plurality of secure servers (act 502). For example, as illustrated above in FIG. 1, the client computer system 102 may attempt to access two or more of the secure servers 104.

The method 500 further includes, from each of the servers in the plurality of secure servers, receiving one or more certificates from the servers and metadata which includes a specification of time (act 504). For example, FIG. 1 illustrates that the client computer system 102 receives specifications of time 110-1, 110-2 and 110-3. Note that in some embodiments, the specification of time may be a secure specification of time. For example, the specification of time may be signed.

The method 500 further includes preventing secure applications from sending sensitive data to the plurality of secure servers until a system time has been determined to be reliable (act 506). For example, FIG. 2 illustrates a plurality of secure applications 212. The secure applications 212 may require secure connections to be established with the secure servers 104 before data can be transmitted between the secure servers 104 and the secure applications 212. An enforcement layer 214 (such as SSL) may prevent the secure applications 212 from communicating with the secure servers 104 due to drastic differences between system time at the client computer system 102 and the secure specifications of time. A reliable system time is one that meets some predetermined security criteria.

The method 500 further includes, from the secure specifications of time, approximating a reliable current system time (act 508). For example, as illustrated in FIG. 2, the time handler 206 may approximate a time.

The method 500 further includes accessing a secure server using the approximated current system time and using the approximated current system time to validate a certificate from the secure server (act 510). For example, as illustrated above, the client computer system 102 may establish a secure connection with the secure server system 104-4 using the approximate current system time.

Some embodiments of the method 500 may further include receiving OCSP validity data from each of the servers in the plurality of secure servers, and using OCSP validity data in the approximation of current system time.

Some embodiments of the method 500 may further include receiving server Unix time from each of the servers in the plurality of secure servers, and using the server Unix time in the approximation of current system time.

The method 500 may be practiced where approximating the current system time comprises combining the specifications of time. For example, embodiments may compute a straight average, a weighted average, or some other combination of received times.

Alternatively or additionally, approximating the current system time comprises selecting one or more preferred specifications of time. For example, embodiments may score or rank specifications of time to allow embodiments to select one or more preferred specifications of time according to the score or rank.

The method 500 may further include identifying a quality factor for each of the times in the secure specification of times. In some such embodiments, approximating the current system time includes using the quality factor. The quality factor may be a rank or score or other appropriate measure.

The method 500 may further include continuing to make secure connections by using the approximate current system time. Thus for example, some embodiments may simply use the approximate current system time rather than attempting to resolve the system using a time server or other time resolution mechanism.

The method 500 may further include determining that a system clock is not trusted, and as a result using the approximate current system time. Thus, embodiments can use the approximate current time if there is reason to believe that the system clock should not be trusted. This could be due to intrusion detection, gross errors in time, or for other reasons.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more hardware processors; and
one or more computer-readable media having stored thereon instructions that are executable by the one or more processors to configure the computer system to establish secure connections from a computing device to secure servers when the computing device starts with an incorrect system clock time that would ordinarily prohibit connection to the secure servers, including instructions that are executable to configure the computer system to perform at least the following:
attempt to access a plurality of secure servers;
receive from each of at least a first secure server and a second secure server of the plurality of secure servers, a certificate and associated metadata comprising a secure specification of time, wherein a first secure specification of time received in the certificate from the first secure server is in a different format than a second secure specification of time received in the certificate from the second secure server;
prevent secure applications from sending sensitive data to the plurality of secure servers until a system time has been determined to be reliable;
from the first and second secure specifications of time, approximate a reliable current system time based at least on a weighting applied to the first and second secure specifications of time, wherein each of the first and second secure specifications of time are weighted according to a system preference associated with the format of the particular secure specification of time; and
access another secure server using the approximated current system time and use the approximated current system time to validate a certificate from the other server.

2. The system of claim 1, wherein the first secure specification of time received from the first secure server is in a format that includes online certificate status protocol (OCSP) validity data that is used in the approximation of current system time.

3. The system of claim 2, wherein the second secure specification of time received from the second secure server is in a format that includes Unix time that is used in the approximation of current system time.

4. The system of claim 1, wherein approximating the current system time comprises combining the specifications of time.

5. The system of claim 1, wherein approximating the current system time comprises selecting one or more preferred specifications of time based at least on the weighting applied to the first and second secure specifications of time.

6. The system of claim 1, wherein the one or more computer-readable media further have stored thereon instructions that are executable by the one or more processors to configure the computer system to identify a quality factor for each of the times in the secure specification of times, and wherein approximating the current system time comprises using the quality factor in addition to the weighting applied to the first and second secure specifications of time.

7. The system of claim 1, wherein the one or more computer-readable media further have stored thereon instructions that are executable by the one or more processors to configure the computer system to continue to make secure connections by using the approximate current system time.

8. The system of claim 1, wherein the one or more computer-readable media further have stored thereon instructions that are executable by the one or more processors to configure the computer system to determine that a system clock is not trusted, and as a result use the approximate current system time.

9. In a computing environment, a method of establishing secure connections from a computing device to secure servers when the computing device starts with an incorrect system clock time that would ordinarily prohibit connection to the secure servers, the method comprising:
   attempting to access a plurality of secure servers;
   receiving from each of at least a first secure server and a second secure server of the plurality of secure servers, a certificate and associated metadata comprising a secure specification of time, wherein a first secure specification of time received in the certificate from the first secure server is in a different format than a second secure specification of time received in the certificate from the second secure server;
   preventing secure applications from sending sensitive data to the plurality of secure servers until a system time has been determined to be reliable;
   from the first and second secure specifications of time, approximating a reliable current system time based at least on a weighting applied to the first and second secure specifications of time, wherein each of the first and second secure specifications of time are weighted according to a system preference associated with the format of the particular secure specification of time; and
   accessing another secure server using the approximated current system time and using the approximated current system time to validate a certificate from the other server.

10. The method of claim 9, further comprising receiving online certificate status protocol (OCSP) validity data from at least the first secure server, and using the OCSP validity data in the approximation of current system time.

11. The method of claim 10, further comprising receiving server Unix time from each at least the second secure server, and using the server Unix time in the approximation of current system time.

12. The method of claim 11, wherein approximating the current system time comprises combining the specifications of time.

13. The method of claim 9, wherein approximating the current system time comprises selecting one or more preferred specifications of time based at least on the weighting applied to the first and second secured specifications of time.

14. The method of claim 9, further comprising identifying a quality factor for each of the times in the secure specification of times, and wherein approximating the current system time comprises using the quality factor in addition to the weighting.

15. The method of claim 9, further comprising continuing to make secure connections by using the approximate current system time.

16. The method of claim 9, further comprising, determining that a system clock is not trusted, and as a result using the approximate current system time.

17. A computing system comprising:
   one or more hardware processors;
   one or more secure applications, operating at the one or more hardware processors, configured to attempt to connect to secure servers;
   a time handler, operating at the one or more hardware processors, that is configured to access metadata from attempts to connect to secure servers, the metadata from each secure server including a specification of time, wherein a first secure specification of time received in the metadata from a first secure server is in a different format than a second secure specification of time received in the metadata from a second secure server;
   an enforcement layer, operating at the one or more hardware processors, that is configured to prevent secure applications from sending sensitive data to the plurality of secure servers until a system time is determined to be reliable; and
   wherein the time handler comprises a time computation engine configured to approximate a reliable current system time based at least on a weighting applied to the first and second secure specifications of time, wherein each of the first and second secure specifications of time are weighted according to a system preference associated with the format of the particular secure specification of time.

18. The computing system of claim 17, wherein the computing system is configured to exclude a backup battery for maintaining time data.

19. The computing system of claim 17, wherein the computing system is configured to exclude any battery power for the system, such that removal of an external power source results in the system reverting back to a default state, including at least one of a default system time or a random system time.

20. The computing system of claim 17, wherein the time handler is configured to identify a quality factor for each of the times in the secure specification of times.

* * * * *